United States Patent [19]

Kobayashi

[11] Patent Number: 5,003,008

[45] Date of Patent: Mar. 26, 1991

[54] METHOD FOR THE PREPARATION OF SHAPED ARTICLE OF CROSSLINKED POLY (VINYLIDENE FLUORIDE)

[75] Inventor: Nobuo Kobayashi, Tokyo, Japan

[73] Assignee: TDK Corporation, Tokyo, Japan

[21] Appl. No.: 427,017

[22] Filed: Oct. 25, 1989

[30] Foreign Application Priority Data

Oct. 26, 1988 [JP] Japan .................................. 63-268103

[51] Int. Cl.$^5$ ............................................. C08L 27/16
[52] U.S. Cl. ..................................... 525/104; 525/288
[58] Field of Search ................................ 525/104, 288

[56] References Cited

U.S. PATENT DOCUMENTS 4,707,577 11/1987 Bullen et al. ......................... 525/104

FOREIGN PATENT DOCUMENTS 2106947 5/1987 Japan ................................... 525/288

*Primary Examiner*—Paul R. Michl
*Assistant Examiner*—Karen A. Hellender
*Attorney, Agent, or Firm*—Wyatt, Gerber, Burke & Badie

[57] ABSTRACT

Shaped articles of a crosslinked poly(vinylidene fluoride) resin can be prepared in a relatively simple process to be imparted with greatly improved resistance against heat, water, and chemicals in a much higher productivity than in the conventional electron-beam irradiation method. The method comprises the steps of (a) compounding the resin with an organosilane compound having an ethylenically unsaturated group, e.g., vinyl, and at least one alkoxy group in a molecule and a free-radical generator, e.g., organic peroxides, (b) heating the resin compound to effect graft-polymerization of the organosilane compound to the polymer molecules, (c) shaping the resin compound into a desired form, and (d) heating the shaped body in water containing a silanol-condensation catalyst dissolved or dispersed therein.

13 Claims, No Drawings

METHOD FOR THE PREPARATION OF SHAPED ARTICLE OF CROSSLINKED POLY (VINYLIDENE FLUORIDE)

BACKGROUND OF THE INVENTION

The present invention relates to a method for the preparation of a shaped article of a crosslinked poly(vinylidene fluoride) resin. More particularly, the invention relates to a low-cost method for the industrial preparation of a shaped article of a crosslinked poly(vinylidene fluoride) resin, which is uniformly crosslinked to the depth of the core portion of the article and has greatly improved resistance against heat, water and chemicals.

It is known that poly(vinylidene fluoride) resins can be crosslinked by the irradiation with electron beams in a dose of several Mrad to several tens of Mrad in the absence or presence of a crosslinking aid to enhance the efficiency of the crosslinking reaction with an object to improve various properties of the shaped articles of the resin (see, for example, U.S. Pat. No. 3,269,862). This method by the electron beam irradiation is, however, disadvantageous, due to the high costs for the very expensive apparatus of electron beam irradiation and has a limitation in the applicability to thick-walled articles or articles of an irregular form due to the relatively small penetrability of electron beams through synthetic resin bodies.

Apart from poly(vinylidene fluoride) resins, Japanese Patent Publication 61-50484 teaches that certain halogen-containing synthetic resins, e.g., chlorinated polyethylenes, poly(vinyl chloride) resins, poly(vinylidene chloride) resins and the like, can be crosslinked by the reaction with a mercapto group-containing organosilane compound as a crosslinking agent. This method, however, is not applicable to poly(vinylidene fluoride) resins because the mercapto group containing organosilane compound acts as a dehydrofluorinating agent of the poly(vinylidene fluoride) resin to introduce ethylenically unsaturatred double bonds to the main chain structure of the polymer rather than to act as a crosslinking agent.

SUMAMRY OF THE INVENTION

The present invention accordingly has an object to provide a novel and improved low-cost method for the preparation of a shaped article of a crosslinked poly(vinylidene fluoride) resin having improved properties such as heat resistance, mechanical properties and the like in a simple and efficient procedure without the above described problems and disadvantages in the prior art methods.

Thus the method of the present invention for the preparation of a shaped article of a crosslinked poly(vinylidene fluoride) resin comprises the steps of:

(a) compounding a poly(vinylidene fluoride) resin with an organosilane compound represented by the general formula $$R^1_{4-n}SiR^2_n, \quad (I)$$

in which $R^1$ is an ethylenically unsaturated group, $R^2$ is an alkoxy group or an alkoxy-substituted alkoxy group and the subscript n is 1, 2 or 3, and a free-radical generator to give a resin compound;

(b) heating the resin compound to effect graft-polymerization of the organosilane compound on to the molecules of the poly(vinylidene fluoride) resin;

(c) shaping the resin compound into a form of an article; and (d) heating the thus shaped article in the presence of water and a silanol-condensation catalyst in contact therewith.

DETAILED DESCRIPTION OF THE PREFERRED EMBODIMENTS

As is described above, the inventive method comprises the essential steps (a) to (d). This method is applicable not only to homopolymeric poly(vinylidene fluoride) resins but also to other copolymeric resins mainly composed of the moiety of vinylidene fluoride.

In step (a) of the inventive method, the poly(vinylidene fluoride) resin is compounded with a specific organosilane compound represented by the general formula (I) given above and a free-radical generator. In the general formula (I), the symbol $R^1$ denotes an ethylenically unsaturated group bonded to the silicon atom exemplified by vinyl, allyl, 3-acryloxypropyl and 3-methacryloxypropyl groups and the symbol $R^2$ denotes an alkoxy group or an alkoxy-substituted alkoxy group exemplified by methoxy, ethoxy, propoxy, butoxy, pentoxy, $\beta$-methoxyethoxy and $\beta$-ethoxyethoxy groups. The subscript n is an integer of 1, 2 or 3.

Particular examples of the organosilane compound include, though not limited thereto; vinyl tri($\beta$-methoxyethoxy) silane; vinyl trimethoxy silane; vinyl triethoxy silane; vinyl tri-n-propoxy silane; vinyl tri-n pentoxy silane; divinyl di($\beta$-methoxyethoxy) silane; divinyl dimethoxy silane; divinyl diethoxy silane; divinyl di-n propoxy silane; divinyl di(isopropoxy) silane; divinyl di-n-pentoxy silane; trivinyl methoxy silane; trivinyl n-pentoxy silane; trivinyl $\beta$-methoxyethoxy silane; 3-acryloxypropyl trimethoxy silane; 3-methacryloxypropyl trimethoxy silane and the like, of which vinyl tri($\beta$-methoxyethoxy) silane is particularly preferred.

The free radical generator to be compounded with the poly(vinylidene fluoride) resin includes various kinds of organic peroxides, of which the half-life period at 150° C. is 1 minute or longer, and is exemplified by 1,3-bis(tert-butylperoxy isopropyl) benzene, dicumyl peroxide, dibutyl peroxide and the like, of which 1,3-bis(tert-butylperoxy isopropyl) benzene is particularly preferred.

The amount of the organosilane compound compounded with the poly(vinylidene fluoride) resin is in the range from 1 to 30% by weight or, preferably, from 3 to 20% by weight or, more preferably, from 5 to 15% by weight based on the amount of the resin. When the amount of the organosilane compound is too small, the desired effect of crosslinking can be obtained only insufficiently while an excessively large amount thereof is undesirable due to the uneven distribution of the crosslinks in the crosslinked resin. The amount of the free-radical generator compounded with the resin is in the range from 0.1 to 20% by weight or, preferably, from 0.3 to 1% by weight based on the amount of the resin. The poly(vinylidene fluoride) resin and the above defined additives can be compounded by any known method using a suitable blending machine such as kneaders.

The thus obtained resin compound is then subjected to a heat treatment in step (b) to effect graft copolymerization of the silane compound on to the molecules of the poly(vinylidene fluoride) resin. Instead of heating a solid resin compound, it is optional that the resin and the additives are dissolved in a suitable organic solvent such as N,N-dimethyl formamide and the solution is heated to effect the graft copolymerization. The heat treatment is conducted at a temperature in the range from 150° to 250° C. or, preferably, from 170° to 220° C. for 1 to 60 minutes or, preferably, for 3 to 30 minutes.

The organosilane-grafted poly(vinylidene fluoride) resin is then shaped in step (c) into a desired form of the article such as films, sheets, rods, tubes and the like. The wall thickness of the thus shaped article may have some influences on the length of time for the crosslinking treatment in the subsequent step (d) although a shaped article having a wall thickness of even 20 mm or larger can be effectively crosslinked. The shaping method is not particularly limitative including any known method conventionally applied to poly(vinylidene fluoride) resins such as extrusion molding, injection molding, compression molding and the like.

The shaped body of the organosilane-grafted poly(-vinylidene) fluoride resin is then subjected to a crosslinking treatment in step (d) by heating while it is in contact with water in the presence of a condensation catalyst. The most convenient way to conduct this crosslinking treatment is to heat the shaped body of the organosilane-grafted resin in water or a water-containing organic solvent containing the catalyst dissolved or dispersed therein. The amount of water required for the crosslinking reaction is so small that heating the shaped body in an organic solvent containing only an extremely small amount of water may be sufficient to effect the crosslinking reaction. The heat treatment is performed at a temperature in the range from 60° to 100° C. for a length of time in the range from 5 to 48 hours though dependent on the wall thickness of the shaped article.

The condensation catalyst implied here is a compound capable of promoting the hydrolysis reaction of the alkoxy groups of the organosilane compound grafted to the resin molecules and subsequent silanol condensation reaction. Various kinds of compounds are known to be effective as the condensation catalyst in the organosilicon chemistry including, for example, metal carboxylates such as dibutyl tin dilaurate, dioctyl tin dilaurate, tin acetate, tin octoate, lead naphthenate, zinc octoate and the like, titanate ester compounds and chelate compounds of titanium, of which dibutyl tin dilaurate is particularly preferred.

When the crosslinking treatment is performed by heating the shaped body in water or an aqueous organic solvent, the heating medium should contain the condensation catalyst dissolved or dispersed therein in an amount in the range from 1 to 20% by weight or, preferably, from 5 to 10% by weight. When the amount of the catalyst in the heating medium is too small, the crosslinking reaction proceeds in an impractically low velocity while an excessively increased amount of the catalyst may have no further improvements in the crosslinking reaction. The temperature of the heating medium in this crosslinking treatment should be as high as possible from the standpoint of increasing the velocity of the crosslinking reaction.

Alternatively, the crosslinking reaction can be effected by heating the shaped body of the organosilane-grafted resin in an atmosphere of high-temperature steam. In this case, the condensation catalyst may be compounded beforehand in the organosilane-grafted resin before shaping. The amount of the condensation catalyst compounded in the resin can be very small when the temperature of the steaming treatment is high. The crosslinking reaction can proceed even in the absence of any condensation catalyst when the temperature of the steaming treatment is sufficiently high. Usually, the amount of the condensation catalyst compounded in the resin is in the range from 0.1 to 10% by weight or, preferably, from 0.1 to 5% by weight based on the organosilane-grafted resin. No further additional advantages can be obtained by increasing the amount of the catalyst over the above mentioned upper limit.

The method of the present invention for the preparation of a shaped article of a crosslinked poly(vinylidene fluoride) resin is advantageous as compared with the conventional method of electron beam irradiation in respect to the versatility of the method relative to the wall thickness and configuration of the shaped article. Namely, the electron beam irradiation method is applicable only when the shaped article has a wall thickness of about 2 mm or smaller while the inventive method is applicable even to a shaped body having a thickness of 20 mm or larger by adequately extending the length of time for the crosslinking treatment in step (d). Consequently, it is easy in the inventive method to obtain a higher crosslinking density and hence higher mechanical strengths as well as higher resistance against heat, water, and chemicals of the shaped body than in the conventional electron beam irradiation method. Accordingly, the inventive method is applicable, for example, to the insulation of a crosslinked poly(vinylidene fluoride) resin on electric wires.

In the following, the method of the present invention is described in more detail by way of examples.

EXAMPLE

A resin compound was prepared by uniformly blending, at a temperature of 185° to 220° C. in a kneader, 100 g of a poly(vinylidene fluoride) resin, 10 g of vinyl tri($\beta$-methoxyethoxy) silane and 1 g of 1,3-bis(tert-butylperoxy isopropyl) benzene and the resin compound was heated at 200° C. for 10 minutes to effect the graft-polymerization reaction of the organosilane compound on to the molecules of the resin. The thus organosilane-grafted resin was pelletized and shaped by extrusion into a resin sheet having a thickness of 1 mm. The sheet was heated at 80° C. for 24 hours in water in which 10% by weight of dibutyl tin dilaurate was suspended to effect the crosslinking reaction.

The thus obtained crosslinked poly(vinylidene fluoride) resin sheet was subjected to the determination of the gel fraction in the following manner. Thus, 0.2 to 0.3 g of the resin sheet taken by accurate weighing was heated for 10 hours under reflux in 500 ml of a 7:3 by volume mixture of N,N-dimethyl acetamide and acetone with addition of each 0.1% by weight of acetic anhydride and acetyl chloride and then further heated for several hours in acetone under refluxing followed by drying at 70° C. for 16 hours under reduced pressure. The gel fraction, which is a ratio of the weight of the resin sheet after the above described extraction treatment to the weight before the treatment, was 59%.

When the same experimental procedure as above was repeated except that the amount of the organosilane compound was increased to 11.2 g or decreased to 1.0 g, the gel fraction in the crosslinked resin sheet was 69% or 38%, respectively.

COMPARATIVE EXAMPLE

A sheet of poly(vinylidene fluoride) resin having a thickness of 1 mm was irradiated with electron beams in an irradiation dose of 60 Mrad or 120 Mrad. Despite the so large irradiation dose, the gel fraction in the thus crosslinked resin sheet was 20% and 25%, respectively.

What is claimed is:

1. A method for the preparation of a shaped article of a crosslinked poly(vinylidene fluoride) resin which comprises the steps of:
   (a) compounding a poly(vinylidene fluoride) resin with an organosilane compound represented by the general formula $$R^1_{4-n}SiR^2_n,$$

in which $R^1$ is an ethylenically unsaturated group, $R^2$ is an alkoxy group or an alkoxy-substituted alkoxy group and the subscript n is 1, 2 or 3, and a free-radical generator to give a resin compound;
   (b) heating the resin compound to effect graft-polymerization of the organosilane compound on to the molecules of the poly(vinylidene fluoride) resin;
   (c) shaping the resin compound into a form of an article; and
   (d) heating the thus shaped article in the presence of water and a silanol-condensation catalyst in contact therewith.

2. The method for the preparation of a shaped article of a crosslinked poly(vinylidene fluoride) resin as claimed in claim 1 wherein the organosilane compound is selected from the class consisting of vinyl tri(β-methoxyethoxy) silane, vinyl trimethoxy silane, vinyl triethoxy silane, vinyl tri-n-propoxy silane, vinyl tri-n-pentoxy silane, divinyl di(β-methoxyethoxy) silane, divinyl dimethoxy silane, divinyl diethoxy silane, divinyl di-n-propoxy silane, divinyl di(isopropoxy) silane, divinyl di-n-pentoxy silane, trivinyl methoxy silane, trivinyl n-pentoxy silane, trivinyl β-methoxyethoxy silane, 3-acryloxypropyl trimethoxy silane and 3-methacryloxypropyl trimethoxy silane.

3. The method for the preparation of a shaped article of a crosslinked poly(vinylidene fluoride) resin as claimed in claim 2 wherein the organosilane compound is vinyl tri(β-methoxyethoxy) silane.

4. The method for the preparation of a shaped article of a crosslinked poly(vinylidene fluoride) resin as claimed in claim 1 wherein the amount of the organosilane compound is in the range from 1 to 30% by weight based on the poly(vinylidene fluoride) resin.

5. The method for the preparation of a shaped article of a crosslinked poly(vinylidene fluoride) resin as claimed in claim 1 wherein the free-radical generator is an organic peroxide.

6. The method for the preparation of a shaped article of a crosslinked poly(vinylidene fluoride) resin as claimed in claim 5 wherein the organic peroxide is selected from the class consisting of 1,3 bis(tert-butylperoxy isopropyl) benzene, dicumyl peroxide and dibutyl peroxide 7. The method for the preparation of a shaped article of a crosslinked poly(vinylidene fluoride) resin as claimed in claim 6 wherein the organic peroxide is 1,3-bis(tert-butylperoxy isopropyl) benzene.

8. The method for the preparation of a shaped article of a crosslinked poly(vinylidene fluoride) resin as claimed in claim 1 wherein the silanol-condensation catalyst is dibutyl tin dilaurate.

9. The method for the preparation of a shaped article of a crosslinked poly(vinylidene fluoride) resin as claimed in claim 1 wherein heating of the resin compound in step (b) is performed at a temperature in the range from 170° to 220 ° C. for a length of time in the range from 1 to 60 minutes.

10. The method for the preparation of a shaped article of a crosslinked poly(vinylidene fluoride) resin as claimed in claim 1 wherein the amount of the free-radical generator is in the range from 0.1 to 20% by weight based on the amount of the poly(vinylidene fluoride) resin.

11. The method for the preparation of a shaped article of a crosslinked poly(vinylidene fluoride) resin as claimed in claim 1 wherein the shaped article is heated in step (d) in water containing the silanol-condensation catalyst dissolved or dispersed therein.

12. The method for the preparation of a shaped article of a crosslinked poly(vinylidene fluoride) resin as claimed in claim 1 wherein the content of the silanol-condensation catalyst in water is in the range from 1 to 20% by weight.

13. The method for the preparation of a shaped article of a crosslinked poly(vinylidene fluoride) resin as claimed in claim 12 wherein the shaped article is heated in step (d) at a temperature in the range from 60° to 100° C. for a length of time in the range from 5 to 48 hours.

* * * * *